United States Patent [19]

Mougin

[11] 4,172,751

[45] Oct. 30, 1979

[54] METHOD OF MANUFACTURING A PROTECTIVE SKIRT FOR A TABULAR ICEBERG

[75] Inventor: Georges E. Mougin, Papeete, Tahiti, French Polynesia

[73] Assignee: Societe ITI Ltd., Paris, France

[21] Appl. No.: 823,679

[22] Filed: Aug. 11, 1977

[30] Foreign Application Priority Data

Aug. 13, 1976 [FR] France ........................... 76 24713
Apr. 14, 1977 [FR] France ........................... 77 11277

[51] Int. Cl.² ............................................. E02B 1/00
[52] U.S. Cl. .................................. 156/324; 156/227; 156/302; 405/61
[58] Field of Search .............. 156/227, 299, 302, 303, 156/300, 301, 297, 298, 324; 428/57, 58, 59, 60, 61, 62, 121, 124, 194; 29/454; 61/1 F, 1 R

[56] References Cited

U.S. PATENT DOCUMENTS

| 2,803,578 | 8/1957 | Holland | 428/194 |
| 3,289,415 | 12/1966 | Merrill | 137/236 |
| 3,324,917 | 6/1967 | Schirtzinger | 29/454 |
| 3,482,302 | 12/1969 | Williams | 29/454 |
| 3,718,001 | 2/1973 | Harper | 61/1 F |
| 4,045,962 | 9/1977 | Preus | 61/1 F |

FOREIGN PATENT DOCUMENTS

1220980 1/1960 France .
1117552 6/1968 United Kingdom .

*Primary Examiner*—John T. Goolkasian
*Assistant Examiner*—William H. Thrower
*Attorney, Agent, or Firm*—George E. Kersey

[57] ABSTRACT

Panels of cloth or sheet material are reeled out in parallel plane layers and joined in pairs along alternate edges to form a folded structure which can be deployed around at least a part of a tabular iceberg and then allowed to extend concertina-fashion to provide a protective jacket next to the flanks of the iceberg. The upper part of the skirt can be of more robust material in order to stand up to the action of waves and swell, while the submerged portion (deployed concertina-fashion) serves to keep warm water from coming in contact with the iceberg. The skirt is intended to protect icebergs being towed from antartic seas to the tropics.

10 Claims, 6 Drawing Figures

METHOD OF MANUFACTURING A PROTECTIVE SKIRT FOR A TABULAR ICEBERG

This invention relates to a method of manufacturing a skirt for protecting the flanks of a tabular iceberg, and to a skirt manufactured by the method.

The feasibility of towing tabular icebergs to the tropics for use a source of fresh water has been much discussed. Such discussion has envisaged the towing of a tabular iceberg measuring about 3½ km×¾ km. The total thickness is about 250 m to 300 m with the submerged portion extending to a depth which is about 6 to 8 times the height of the portion above sea level.

The manufacture of a protective skirt for such an iceberg runs into problems because of the enormous size involved.

The present invention provides a method of manufacturing a protective skirt for a tabular iceberg, the skirt being constituted, at least in part, by an assembly of panels of cloth or sheet material and the method comprising the steps of:

providing a plurality of panels of cloth or sheet material wound on reels;

so disposing the reels that the panels may be reeled out in a stack of parallel adjacent layers; and providing assembly positions on either side of the stack of panels to so interconnect the edges of the panels in folds that the assembled stack forms a plane structure which is ready-folded, concertina-fashion.

In this way a large portion of the skirt's eventual vertical extent is manufactured folded and remains folded until the skirt is put in place around an iceberg, thereby reducing handling problems during transit from point of manufacture to the iceberg.

The invention also provides a protective skirt for a tabular iceberg, manufactured according to the method.

Non-limiting examples of the invention are described with reference to the accompanying drawings in which.

Figure 1:
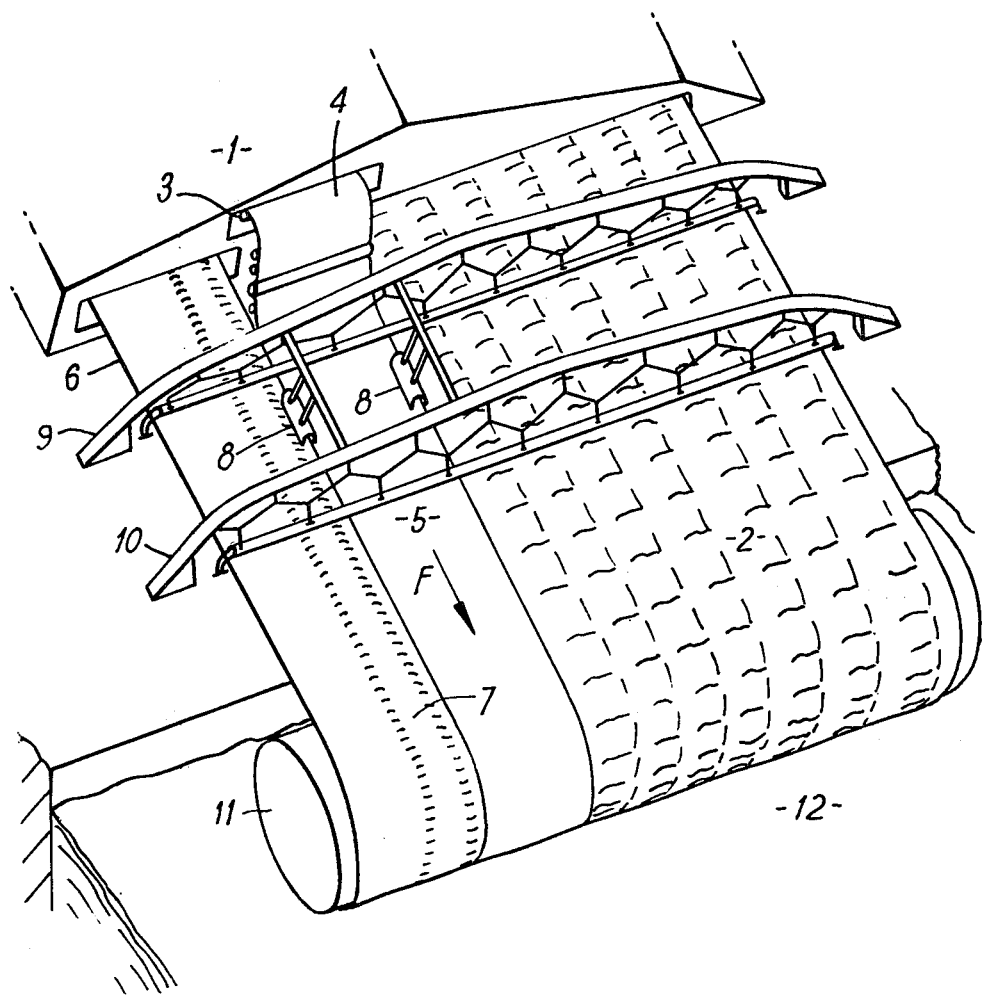
FIG. 1 is a partially cut-away, diagrammatic perspective view of a waterside factory for manufacturing a protective skirt composed of a thick belt, a sheath and a hem.

There is a table of reference numerals and their corresponding terms at the end of the description.

FIG. 1 is a diagram showing the principles of a factory situated beside the sea. The diagram shows the arrangement of workshops 1 for assembly of prefabricated parts of the upper thick belt 2 of a protective skirt for a tabular iceberg. The assembly workshops 1 also shelter reeling machines 3 for reeling out panels 4 of cloth or sheet material used for manufacturing a sheath 5 and a hem 6 which further includes ballast 7 of which the skirt is also constituted. The skirt passes through a zone of assembly positions 8 which are suspended from gantries 9 and 10 supported on either side of the skirt being manufactured. The completed skirt is then wound onto a drum 11 which floats on the sea 12 beside which the factory is built. The skirt is manufactured resting on an assembly table 13 (see FIG. 2) and it is moved forward during manufacture in the direction of an arrow F. It will be noticed that only a portion of the skirt is manufactured folded. Since the sheath 5 and the hem 6 are relatively thin, they are superposed on themselves by folding to make up the thickness of the belt 2 which must be thick to be strong enough to stand up to the action of waves and swell when the skirt is put in position around a tabular iceberg. By way of indication, the width of the thick belt 2 disposed at the upper position of the skirt may be from 15 to 30 m, that of the balasted hem 6 less than 10 to 20 m and that of the intermediate sheath 5 in the order of 200 m. About 200 m of skirt are wound onto any one drum 11.

Figure 2:
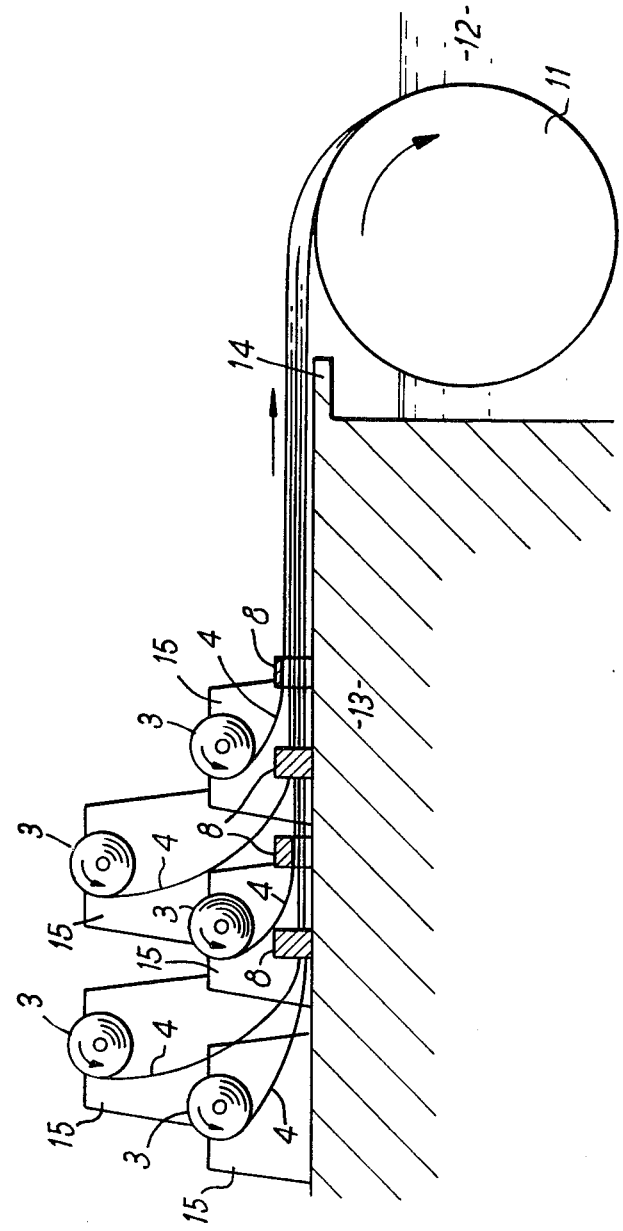
FIG. 2 is a side view in partial section of the factory.

FIG. 2 is a longitudinal section through part of the factory shown in FIG. 1, and it shows, in particular, the assembly table 13 and the assembly positions 8. The assembly table 13 extends to the sea 12 and terminates in a projection 14 which overhangs the sea 12 in order to enable the drum 11 to come as close as possible to the assembly table 13 while floating on the sea 12. Thus after being manufactured the skirt is immediately wound onto the drum 11 for towing to the southern seas where it will be wrapped around a tabular iceberg. The reeling machines 3 are in the form of drums astride the assembly table 13 and reel out the panels 4 of cloth or sheet which slide over the assembly table 13. The reeling machines 3 are held above the assembly table 13 by stands 15 disposed on either side of the assembly table 13. The panels 4 may be of a width as supplied by their manufacturers or alternatively, before being temporarily reeled onto the reeling machines 13, a few manufactured panels may be initially assembled by welding or stitching in order to make up the desired width of panel 4.

In either case, at the assembly positions 8 the panels 4 are assembled concertina-fashion by lateral welding or stitching. The assembly positions 8 are alternately disposed on either side of the assembly table 13 and a new panel 4 is reeled out to join the already assembled stack of panels in between successive assembly positions 8.

Figure 3:
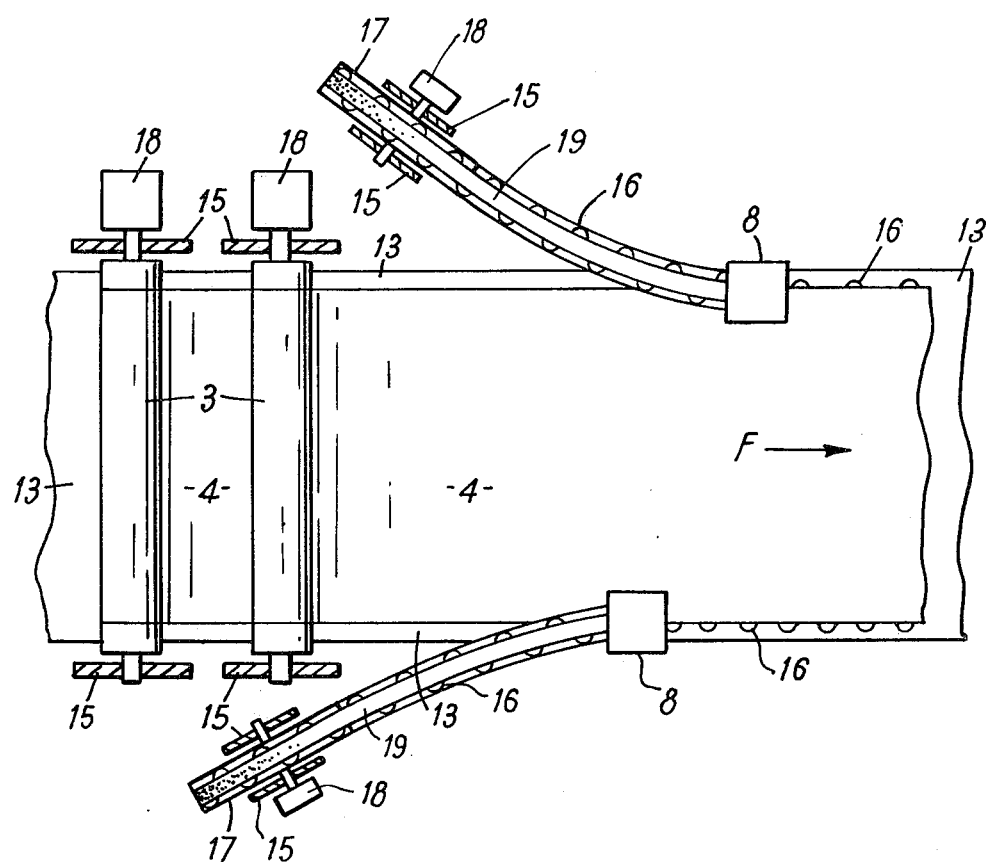
FIG. 3 is a plan view of a skirt assembly table for inserting distance pieces to fend the sheath off the sides of the iceberg.

FIG. 3 is a partial plan view of an assembly table 13 for skirts including distance pieces 16 which are fairly stiff. The distance pieces 16 have a zig-zag shape and are provided to fend the skirt off to a certain distance from the sides of the iceberg it is protecting. For this purpose, large radius spools 17 are disposed on either side of the assembly table 13. The spools 17 on which the distance pieces 16 are wound are driven by motors 18, likewise the reeling machines 3 are driven by motors 18. The reeling machines 3 and the spools 17 are supported by stands 15 placed around the assembly table 13. The stands 15 which support the drum-shaped reeling machines 3 are arranged in pairs on either side of the said assembly table 13 in order to hold the reeling machines 3 astride the assembly table 13. The stands 15 for each of the spools 17 are both mounted on the same side of the assembly table 13 since the distance pieces 16 engage the sides of the assembly table 13 and are not superposed thereon as are the panels 4. The assembly positions 8 are disposed alternately on either side of the table 13 for assembly of the panels 4 with the distance pieces 16. The panels 4 may be directly connected to each other, however, it appears to be preferable to interconnect them by means of connecting strips 19 which can previously be fixed to the distance pieces 16 as shown in FIG. 3. It is also possible to fix the connecting strips 19 to the panels 4 before their interconnection and their connection to the distance pieces 16.

Figure 4:
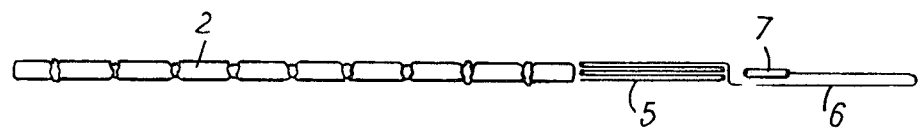
FIG. 4 is a section through a skirt as manufactured in the factory of FIG. 1.

FIG. 4 is a section through a skirt manufactured ready-folded in a factory as described with reference to FIG. 1. The skirt includes the thick belt 2, the sheath 5 and the balasted hem 6 from which there hangs the balast 7. Once put in place round an iceberg the skirt comprises a single thickness of panel 4, although the mechanical and thermal properties of the panels 4 may preferably vary according to their depth (ie the upper panels have to hold up the lower panels and also they have to protect the iceberg against a greater temperature difference).

Figure 5:
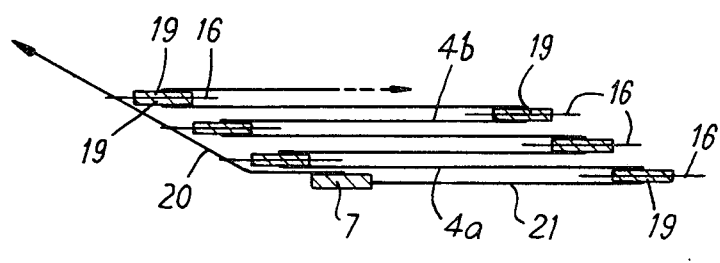
FIGS. 5 and 6 are sections through two variants of a skirt folded concertina-fashion and including distance pieces.

FIG. 5 is a section through a part of a folded skirt which includes distance pieces 16. Once put in place this skirt comprises a single thickness of panel 4. In principle, none of the panels 4 is intended, by virtue of its own thickness, to offer any significant resistance to the mechanical action of waves or swell. The panels 4 are disposed parallel to each other. At their sides there are fixed the connecting strips 19 through which the zig-zag distance pieces 16 are linked. The bends in the distance pieces 16 in conjunction with the connecting strips 19 form loops through which retainting cables 20 are passed. These retaining cables are attached to the balast which is attached to the bottom edge of the lowest one 21 of the panels 4 or else to one of the said loops. These retaining cables 20 are also temporarily fixed to the upper end cheek of the drum 11. To obtain a folded stack of minimum thickness two widths of panels 4 are provided, the panels 4 of alternate layers 4a and 4b being of different widths. In this way the connecting strips 19 and their distance pieces 16 are not superposed during manufacture, thereby reducing the total thickness wound on the drum 11.

Figure 6:
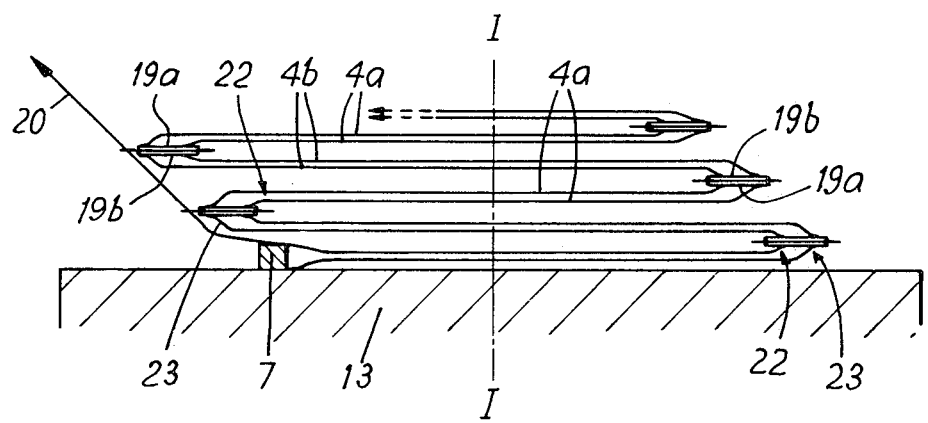

FIG. 6 is a schematic section through a "double-glazed" variant of the folded portion of the skirt. This variant comprises two layers of panels 4 for disposition parallel to the sides of a tabular iceberg. In this variant it is even more important to stagger the folds in order to avoid excessive thickness when rolled onto the drum 11. The connecting strips 19 are again threaded by zig-zag distance pieces 16, but this time they are in pairs sandwiching the distance pieces 16. The outer faces 19a and 19b of such a pair of connecting strips 19 are fixed to two panels 4. The panels 4a which are fixed to one of said outer faces 19a are wider than the panels 4b which are fixed to the other of said outer faces 19b, thereby producing a skirt of alternate "wide" and "narrow" panels 4 whose edges are staggered as desired when rolled on the drum 11. At each fold, there are two panels 4 (one upper, one lower) whose connection zone 22 with the connecting strips 19a and 19b is on the inside of the fold, and likewise there are two panels 4 whose connection zone 23 with the connecting strips 19a and 19b is on the outside of the fold. Each panel 4, regardless of whether it is a "wide" panel 4a or a "narrow" panel 4b, is connected at an outside connection zone 23 along one of its edges, and at an inside connection zone 22 along its other edge. During assembly the inside connection zone 22 of each connecting strip 19 is assembled before its outside connection zone 23.

Retaining cables 20 are threaded through the loops formed between the connecting strips 19 and the bends in the distance pieces 16 to be attached either to one of the loops or else to the ballast 7 which is fixed to the lower edge of the skirt. The other ends of the retaining cables 20 are attached to the upper cheek of the drum 11 until the skirt is deployed around an iceberg.

| Reference Numerals | |
|---|---|
| 1 | workshops |
| 2 | thick belt |
| 3 | reeling machines |
| 4 | panel |
| 4a, 4b | "wide" panel, "narrow" panel |
| 5 | sheath |
| 6 | hem |
| 7 | ballast |
| 8 | assembly positions |
| 9, 10 | gantry |
| 11 | drum |
| 12 | sea |
| 13 | assembly table |
| 14 | projection of assembly table |
| 15 | stand |
| 16 | distance piece |
| 17 | spool |
| 18 | motor |
| 19 | connecting strip |
| 19a, 19b | outer faces of connecting strip |
| 20 | retaining cables |
| 21 | lowest panel |
| 22, 23 | connecting zones |

What is claimed is:

1. A method of manufacturing an object protective skirt constituted, at least in part, by an assembly of panels of cloth or sheet material, comprising the steps of
   providing a plurality of panels of cloth or sheet material wound on reels;
   so disposing the reels that the panels may be reeled out in a stack of parallel adjacent layers;
   providing assembly positions on either side of the stack of panels to so interconnect the edges of the panels in folds that the assembled stack forms a plane structure which is ready-folded, concertina-fashion;
   and inserting distance pieces, each in the form of a stiff zig-zag member, between the panels at the assembly positions to fend the protective skirt off the sides of the object when in position thereabout.

2. A method according to claim 1, wherein each of said panels of cloth or sheet material wound on a reel comprises a plurality of panels interconnected edgewise to form a wider, composite panel.

3. A method according to claim 1 wherein said assembly positions are alternately disposed along the length of the stack of parallel layers, with at least one more layer being reeled out to join the stack between each pair of adjacent assembly positions.

4. A method according to claim 1, wherein the assembled stack of panels is wound directly onto a floating drum ready for towing to an iceberg.

5. A method according to claim 1, wherein distance pieces are inserted between the panels at the assembly positions to fend the protective skirt off the sides of an iceberg when in position whereabout.

6. A method according to claim 1, wherein the stiff zig-zag members are sandwiched between connecting strips before assembly of the skirt.

7. A method of manufacturing a protective skirt for an object, said skirt being constituted, at least in part, by an assembly of panels of cloth or sheet material, comprising the steps of
   providing a plurality of panels of cloth or sheet material wound on reels;

so disposing the reels that the panels may be reeled out in a stack of parallel adjacent layers;

fastening connecting strips to the edges of the panels before reeling;

providing assembly positions on either side of the stack of panels and inserting distance pieces between the panels thereat to fend the protective skirt off the sides of the object when in position thereabout;

and interconnecting the edges of the panels by means of the connecting strips and simultaneously connecting the distance pieces thereto, with the edges being connected in folds such that the assembled stack forms a plane structure which is ready-folded, concertina-fashion.

8. A method according to claim 7, wherein the skirt, when unfolded, comprises a plurality of parallel panels and wherein the assembly positions are arranged to interconnect the panels at each fold, starting with the innermost connection of the fold and finishing with its outermost connection.

9. A method according to claim 7, wherein adjacent panels of the skirt are of differing widths, whereby the folds are staggered in the assembled stack of parallel layers, thereby reducing the thickness of the stack.

10. A protective skirt for a tabular iceberg manufactured according to the method of claim 7.

* * * * *